United States Patent
Qi et al.

(10) Patent No.: US 12,189,166 B2
(45) Date of Patent: Jan. 7, 2025

(54) BACKLIGHT ASSEMBLY AND DISPLAY APPARATUS

(71) Applicants: Beijing BOE Display Technology Co., Ltd., Beijing (CN); BOE Technology Group Co., Ltd., Beijing (CN)

(72) Inventors: Yongle Qi, Beijing (CN); Rui Han, Beijing (CN); Qing Ma, Beijing (CN); Daekeun Yoon, Beijing (CN); Dong Cui, Beijing (CN); Zhipeng Zhang, Beijing (CN); Yuanyuan Zhu, Beijing (CN); Weining Chi, Beijing (CN); Fengping Wang, Beijing (CN); Shouyang Leng, Beijing (CN); Wenyang Li, Beijing (CN); Yue Zhai, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/015,723

(22) PCT Filed: Feb. 14, 2022

(86) PCT No.: PCT/CN2022/076235
§ 371 (c)(1),
(2) Date: Jan. 12, 2023

(87) PCT Pub. No.: WO2023/151087
PCT Pub. Date: Aug. 17, 2023

(65) Prior Publication Data
US 2024/0248250 A1  Jul. 25, 2024

(51) Int. Cl.
F21V 8/00 (2006.01)

(52) U.S. Cl.
CPC .......... *G02B 6/004* (2013.01); *G02B 6/0068* (2013.01); *G02B 6/0076* (2013.01)

(58) Field of Classification Search
CPC ..... G02B 6/004; G02B 6/0068; G02B 6/0076
See application file for complete search history.

(56) References Cited

U.S. PATENT DOCUMENTS

2008/0285306 A1  11/2008  Sugihara et al.
2009/0251638 A1  10/2009  Hsu et al.
(Continued)

FOREIGN PATENT DOCUMENTS

CN  1797106 A  7/2006
CN  1973239 A  5/2007
(Continued)

OTHER PUBLICATIONS

Feng et al., Jul. 2006, CN 1797106 (Year: 2006).*
Shan et al., Nov. 2021, CN 214954193 (Year: 2021).*

*Primary Examiner* — Mary Ellen Bowman
(74) *Attorney, Agent, or Firm* — Ling Wu; Stephen Yang; Ling and Yang Intellectual Property

(57) ABSTRACT

Disclosed is a backlight assembly, including first and second light guide plates, and first and second light sources; light emitted by the first light source can be emitted from a surface of the first light guide plate facing the second light guide plate at a first set emitting angle, after being incident into the first light guide plate and reflected by a plurality of first microstructures disposed on a surface of the first light guide plate facing away from the second light guide plate; light emitted by the second light source can be emitted from a surface of the second light guide plate facing away from the first light guide plate at a second set emitting angle, after being incident into the second light guide plate and reflected by a plurality of second microstructures disposed on a
(Continued)

surface of the second light guide plate facing the first light guide plate.

19 Claims, 8 Drawing Sheets

(56) References Cited

U.S. PATENT DOCUMENTS

| | | |
|---|---|---|
| 2010/0328355 A1 | 12/2010 | Fukushima et al. |
| 2016/0282542 A1 | 9/2016 | Seo et al. |
| 2016/0349444 A1 | 12/2016 | Robinson et al. |
| 2017/0108629 A1 | 4/2017 | Lin |

FOREIGN PATENT DOCUMENTS

| | | |
|---|---|---|
| CN | 101517630 A | 8/2009 |
| CN | 102707446 B | 4/2014 |
| CN | 103823308 A | 5/2014 |
| CN | 103883930 A | 6/2014 |
| CN | 104656307 A | 5/2015 |
| CN | 105745925 A | 7/2016 |
| CN | 108627991 A | 10/2018 |
| CN | 110133781 A | 8/2019 |
| CN | 111176016 A | 5/2020 |
| CN | 113556532 A | 10/2021 |
| CN | 214954193 U | 11/2021 |
| TW | 201701033 A | 1/2017 |

* cited by examiner

BACKLIGHT ASSEMBLY AND DISPLAY APPARATUS

CROSS-REFERENCE TO RELATED APPLICATION

The present application is a U.S. National Phase Entry of International Application No. PCT/CN2022/076235, having an international filing date of Feb. 14, 2022, the entire content of which is hereby incorporated by reference.

TECHNICAL FIELD

Embodiments of the present disclosure relate to, but are not limited to, the field of display technologies, specifically to a backlight assembly and a display apparatus.

BACKGROUND

A dual-view display apparatus can achieve a function of displaying different images at different viewing angles by using one display screen, and may be applied to a vehicle-mounted display apparatus to achieve a purpose of different images may be viewed at a position of a main driver and a position of a co-polit.

In dual-view display apparatuses with some technologies, a grating is adopted for illuminating or covering corresponding odd and even pixel arrays respectively, or a cylindrical lens is adopted to guide light into a set observation region by using a refraction effect of the cylindrical lens, so as to achieve that the odd pixel arrays and the even pixel arrays are seen at different viewing angles respectively. On the whole, a principle of achieving double-view display by means of a grating barrier or a cylindrical lens is that two pictures are displayed on a same screen at the same time. These two pictures are respectively composed of odd and even pixel columns of a whole picture. Since the odd and even pixel columns display different pictures respectively, an image resolution of dual-view pictures is half that of a normally displayed image. This solution sacrifices the resolution to achieve dual-view display.

SUMMARY

The following is a summary of subject matters described herein in detail. The summary is not intended to limit the protection scope of claims.

An embodiment of the present disclosure provides a backlight assembly, including a first light guide plate and a second light guide plate disposed in parallel and opposite to each other, a first light source disposed on a side of the first light guide plate, and a second light source disposed on a side of the second light guide plate, the first light source and the second light source are located on opposite sides of the backlight assembly, and the second light guide plate is disposed on a light emitting side of the first light guide plate; a plurality of first microstructures are disposed on a surface of the first light guide plate facing away from the second light guide plate, and light emitted by the first light source is able to be emitted from a surface of the first light guide plate facing the second light guide plate at a first set emitting angle, after being incident into the first light guide plate and reflected by the plurality of first microstructures; a plurality of second microstructures are disposed on a surface of the second light guide plate facing the first light guide plate, and light emitted by the second light source is able to be emitted from a surface of the second light guide plate facing away from the first light guide plate at a second set emitting angle, after being incident into the second light guide plate and reflected by the plurality of second microstructures; taking a plane perpendicular to a light emitting surface of the backlight assembly as a reference plane, in the reference plane, the first set emitting angle is biased to one side compared with a front viewing angle direction of the light emitting surface of the backlight assembly, and the second set emitting angle is biased to the other side compared with the front viewing angle direction of the light emitting surface of the backlight assembly.

An embodiment of the present disclosure also provides a display apparatus, including a display panel and the backlight assembly, the backlight assembly is disposed on a side of the display panel facing away from a display side, and the second light guide plate is disposed between the first light guide plate and the display panel.

Other aspects may be understood upon reading and understanding drawings and detailed description.

BRIEF DESCRIPTION OF DRAWINGS

The drawings are intended to provide a further understanding of technical solutions of the present disclosure and constitute a part of the specification, and are used for explaining the technical solutions of the present disclosure together with the embodiments of the present disclosure, and not intended to form limitations on the technical solutions of the present disclosure. Shapes and sizes of components in the drawings do not reflect actual scales, and are only intended to schematically illustrate contents of the present disclosure.

DETAILED DESCRIPTION

Those of ordinary skills in the art should understand that modifications or equivalent replacements may be made to the technical solutions of the embodiments of the present disclosure without departing from the spirit and scope of the technical solutions of the embodiments of the present disclosure, and they should all fall within the scope of the claims of the present disclosure.

Figure 1:
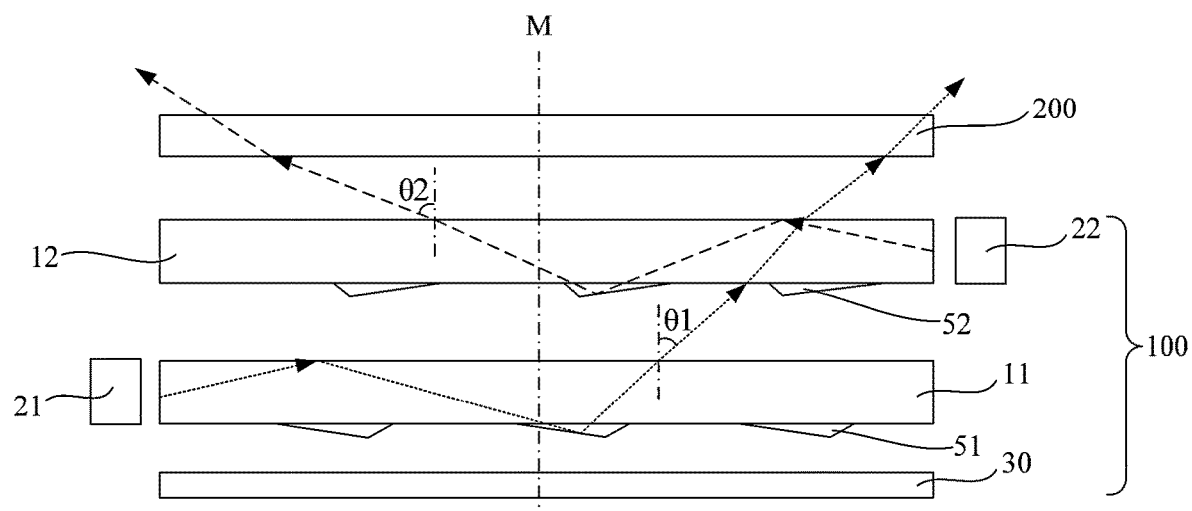
FIG. 1 is a schematic diagram of a structure of a display apparatus according to some exemplary embodiments.

An embodiment of the present disclosure provides a backlight assembly. In some exemplary embodiments, as shown in FIG. 1, FIG. 1 is a schematic diagram of a structure of a display apparatus according to some exemplary embodiments, the display apparatus includes a display panel 200, and a backlight assembly 100 disposed on a side of the display panel 200 facing away from a display side. The backlight assembly 100 includes a first light guide plate 11 and a second light guide plate 12 disposed in parallel and opposite to each other, and a first light source 21 disposed on a side of the first light guide plate 11 and a second light source 22 disposed on a side of the second light guide plate 12, wherein the first light source 21 and the second light source 22 are located on opposite sides of the backlight assembly 100, and the second light guide plate 12 is disposed on a light emitting side of the first light guide plate 11. The second light guide plate 12 is located between the first light guide plate 11 and the display panel 200.

A plurality of first microstructures 51 are disposed on a surface of the first light guide plate 11 facing away from the second light guide plate 12, and light emitted by the first light source 21 can be emitted from a surface of the first light guide plate 11 facing the second light guide plate 12 at a first set emitting angle θ1, after being incident into the first light guide plate 11 and reflected by the plurality of first microstructures 51.

A plurality of second microstructures 52 are disposed on a surface of the second light guide plate 12 facing the first light guide plate 11, and light emitted by the second light source 22 can be emitted from a surface of the second light guide plate 12 facing away from the first light guide plate 11 at a second set emitting angle θ2, after being incident into the second light guide plate 12 and reflected by the plurality of second microstructures 52.

Taking a plane perpendicular to a light emitting surface of the backlight assembly 100 as a reference plane (a plane on which a paper surface is located in an example of FIG. 1), in the reference plane, the first set emitting angle θ1 is biased to one side compared with a front viewing angle direction M of a light emitting surface of the backlight assembly 100 (biased to a right side of the front viewing angle direction M in FIG. 1), and the second set emitting angle θ2 is biased to the other side compared with the front viewing angle direction M of the light emitting surface of the backlight assembly (biased to a left side of the front viewing angle direction M in FIG. 1).

For a backlight assembly according to an embodiment of the present disclosure, a first pointing backlight having a first set emitting angle θ1 may be obtained through a first light source 21 and a first light guide plate 11 that are disposed, a second pointing backlight having a second set emitting angle θ2 may be obtained through a second light source 22 and a second light guide plate 12 that are disposed, and the first pointing backlight and the second pointing backlight are respectively biased to two sides of a front viewing angle direction M of a light emitting surface of the backlight assembly, so that pointing backlight at different viewing angles may be achieved by controlling alternate lighting and extinguishing of the first light source 21 and the second light source 22. In a display apparatus to which the backlight assembly according to the embodiment of the present disclosure is applied, a dual-view display function without a loss of resolution may be achieved by playing of whole frames of different pictures alternately by cooperating with a display panel 200. The display apparatus to which the backlight assembly according to the embodiment of the present disclosure is applied may be applied to scenarios of the field of vehicle-mounted and the like where left and right viewing angles have inconsistent requirements for displayed images.

Figure 2:
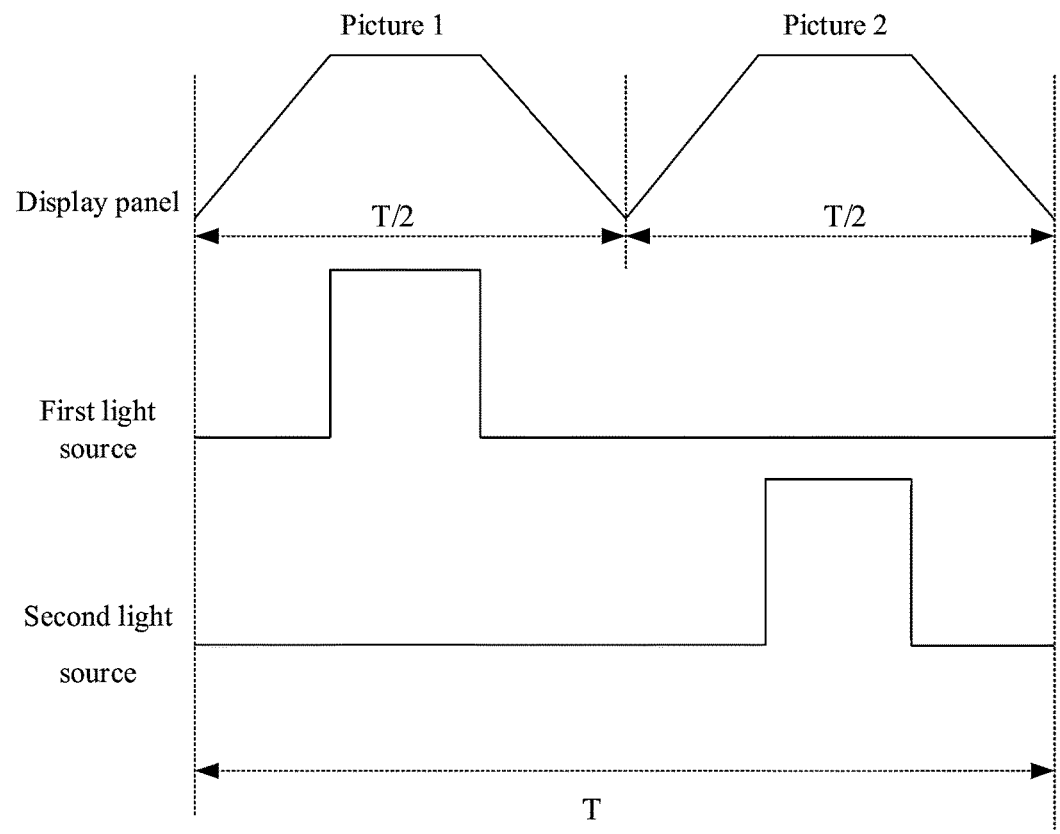
FIG. 2 is a schematic diagram of a control principle of achieving dual-view display by a display apparatus according to some exemplary embodiments.
Figure 3:
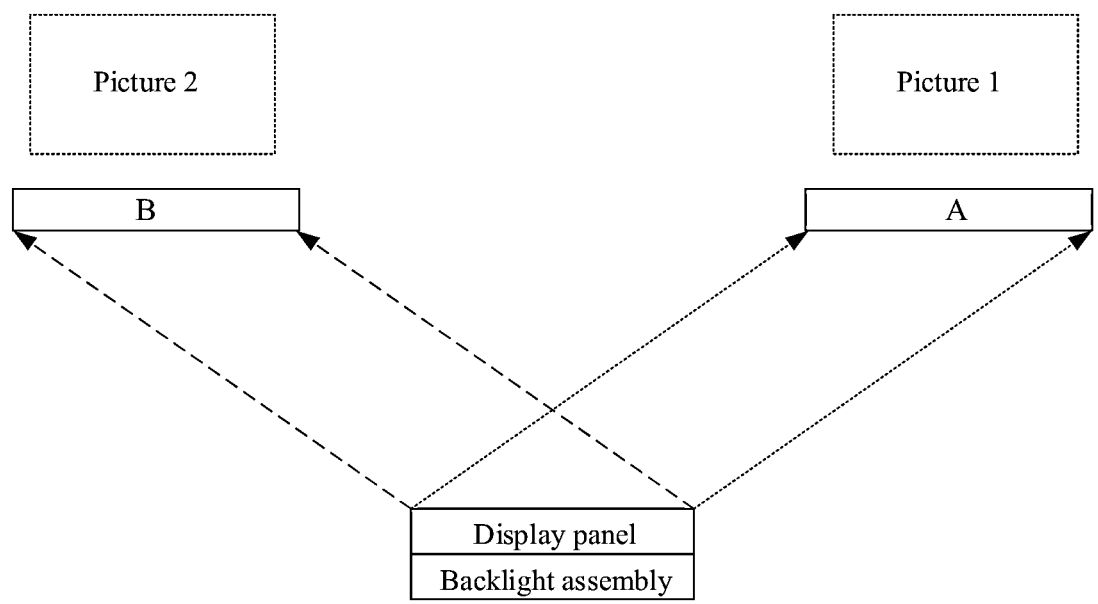
FIG. 3 is a schematic diagram of a structure principle of achieving dual-view display by a display apparatus according to some exemplary embodiments.

In some exemplary embodiments, as shown in FIG. 2 and FIG. 3, FIG. 2 is a schematic diagram of a control principle of achieving dual-view display by a display apparatus according to some exemplary embodiments, FIG. 3 is a schematic diagram of a structure principle of achieving dual-view display by a display apparatus according to some exemplary embodiments, when a first light source 21 of a backlight assembly 100 is on, a second light source 22 is off, the backlight assembly 100 provides a first pointing backlight having a first set emitting angle θ1, the first pointing backlight is biased to a right side of a front viewing angle direction M of a light emitting surface of the backlight assembly 100, a display panel 200 (for example, may be a liquid crystal display panel) displays a picture 1, then the picture 1 displayed by the display panel 200 may be viewed at a first viewing angle (at a position A in FIG. 3, which may be referred to as a right side viewing angle); and when the second light source 22 of the backlight assembly 100 is on, the first light source 21 is off, the backlight assembly 100 provides a second pointing backlight having a second set emitting angle θ2, the second pointing backlight is biased to a left side of the front viewing angle direction M of the light emitting surface of the backlight assembly 100, the display panel 200 displays a picture 2, then the picture 2 displayed by the display panel 200 may be viewed at a second viewing angle (at a position B in FIG. 3, which may be referred to as a left side viewing angle). Exemplarily, each dual-view display period is T (e.g., may be 16 ms), a picture 1 and a picture 2 are each displayed once in each period T, a period of each picture may be set to T/2 (e.g., may be about 8 ms), the picture 1 and the picture 2 may be displayed alternately, and a refresh frequency of a display screen may be 120 Hz or above. A display apparatus of this exemplary embodiment may achieve dual-view picture display without a loss of resolution by relying on a high refresh rate of a screen and fast switching of pointing backlights at different viewing angles.

In some exemplary embodiments, as shown in FIG. 1, light emitted by the first light source 21 is incident into the first light guide plate 11 and may be totally reflected at a position where a first microstructure 51 is not disposed and is then incident into the first microstructures 51, and the light incident into the first microstructures 51 can be totally reflected at the first microstructures 51, and then emitted from a surface of the first light guide plate 11 facing the second light guide plate 12 at the first set emitting angle θ1. In this way, the light emitted by the first light source 21 may be totally reflected both at a position within the first light guide plate 11 where a first microstructure 51 is not disposed and at the first microstructures 51, which may improve a utilization rate of light by the first light guide plate 11.

Light emitted by the second light source 22 is incident into the second light guide plate 12 and may be totally reflected at a position where a second microstructure 52 is not disposed and is then incident into the second microstructures 52, and the light incident into the second microstructures 52 can be totally reflected at the second microstructures 52, and then emitted from a surface of the second light guide plate 12 facing away from the first light guide plate 11 at the second set emitting angle θ2. In this way, the light emitted by the second light source 22 may be totally reflected both at a position within the second light guide plate 12 where a second microstructure 52 is not disposed and at the second microstructures 52, which may improve a utilization rate of light by the second light guide plate 12.

In some exemplary embodiments, a first microstructure is a wedge-shaped protrusion having a triangular cross section; or the first microstructure is a V-shaped groove. A second microstructure is a wedge-shaped protrusion having a triangular cross section; or the second microstructure is a V-shaped groove.

In an example of the present embodiment, as shown in FIG. 1, the first microstructure 51 and the second microstructure 52 may both be a wedge-shaped protrusion having a triangular cross section, and a wedge-shaped protrusion of the first microstructure 51 and a wedge-shaped protrusion of the second microstructure 52 may have opposite directions.

Figure 4A:
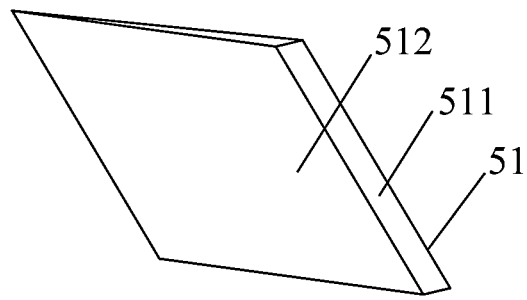
FIG. 4a is a schematic diagram of a structure of a first microstructure of a first light guide plate in some exemplary embodiments.
Figure 4B:
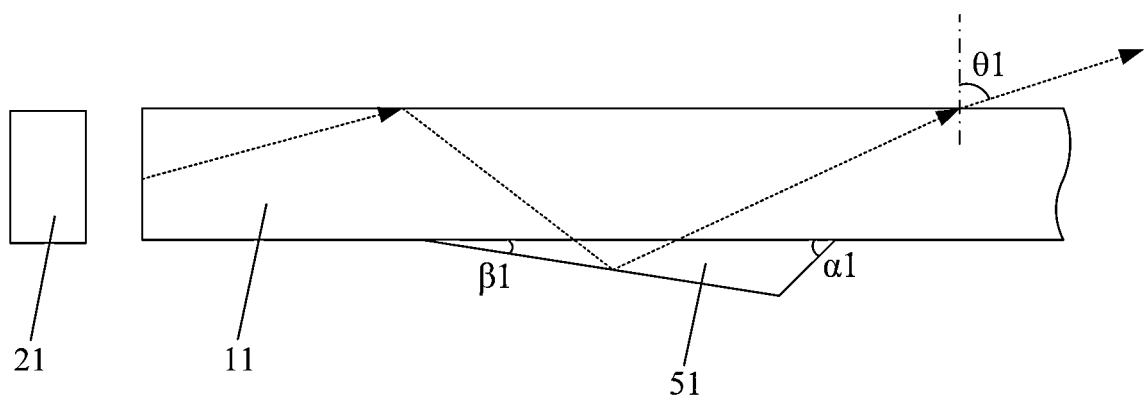
FIG. 4b is a schematic diagram of an optical path of light emitted by a first light source propagating within a first light guide plate in some exemplary embodiments.

Exemplarily, as shown in FIG. 4a and FIG. 4b, FIG. 4a is a schematic diagram of a structure of a first microstructure of a first light guide plate in some exemplary embodiments, FIG. 4b is a schematic diagram of an optical path of light emitted by a first light source propagating within a first light guide plate in some exemplary embodiments, the first microstructure 51 is a wedge-shaped protrusion having a triangular cross section; the first microstructure 51 includes a first surface 511 away from the first light source 21 and a second surface 512 close to the first light source 21, an acute angle between the first surface 511 and a surface of the first light guide plate 11 facing away from the second light guide plate 12 is α1, and an acute angle between the second surface 512 and the surface of the first light guide plate 11 facing away from the second light guide plate 12 is β1, wherein α1>β1; and after light emitted by the first light source 21 is incident into the first light guide plate 11, it can be totally reflected on the second surface 512 of the first microstructure 51. Exemplarily, when the first microstructure 51 is looked down from a side of the first light guide plate 11 facing away from the second light guide plate 12, the second surface 512 may have a rectangular shape, a trapezoidal shape, or other shapes. In this example, a propagation process of the light emitted by the first light source 21 within the first light guide plate 11 may include: the light emitted by the first light source 21 is incident into the first light guide plate 11 in a side-incidence manner, a part of the light is totally reflected at a position where the first microstructure 51 is not disposed, a part of the light is totally reflected on a surface of the first light guide plate 11 facing the second light guide plate 12 and is then incident into the first microstructure 51, and is totally reflected on the second surface 512 of the first microstructure 51 and then emitted from the surface of the first light guide plate 11 facing the second light guide plate 12 at the first set emitting angle θ1; in addition, there is still a part of the light which is incident into the first surface 511 of the first microstructure 51 and is reflected and refracted and then emitted from the first light guide plate 11, this part of emitted light belongs to stray light, and in order to reduce this part of stray light, when designing the first microstructure 51, an area of the first surface 511 may be designed to be smaller.

Figure 5A:
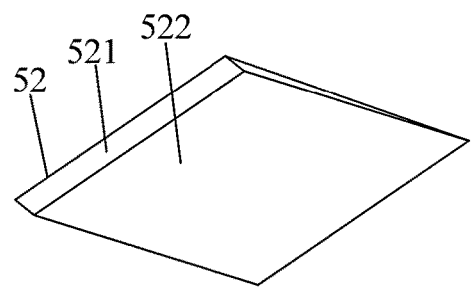
FIG. 5a is a schematic diagram of a structure of a second microstructure of a second light guide plate in some exemplary embodiments.
Figure 5B:
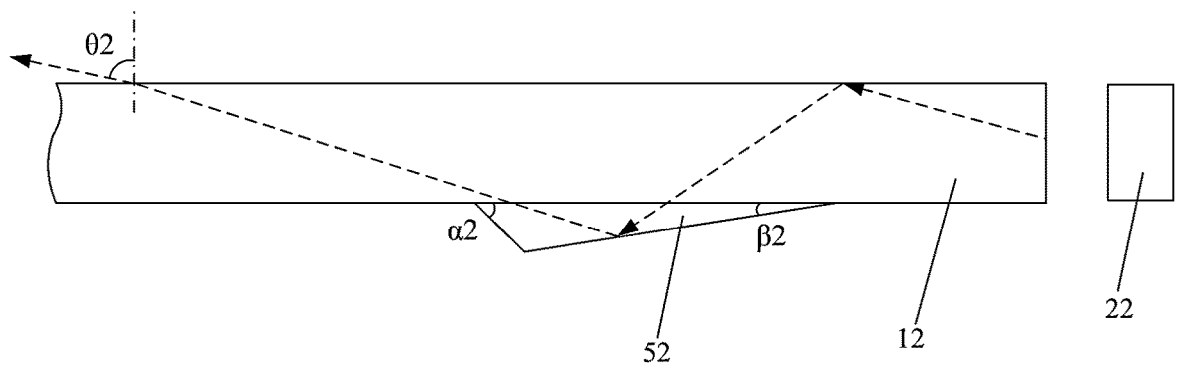
FIG. 5b is a schematic diagram of an optical path of light emitted by a second light source propagating within a second light guide plate in some exemplary embodiments.

Exemplarily, as shown in FIG. 5a and FIG. 5b, FIG. 5a is a schematic diagram of a structure of a second microstructure of a second light guide plate in some exemplary embodiments, FIG. 5b is a schematic diagram of an optical path of light emitted by a second light source propagating within a second light guide plate in some exemplary embodiments, the second microstructure 52 is a wedge-shaped protrusion having a triangular cross section, the second microstructure 52 includes a first surface 521 away from the second light source 22 and a second surface 522 close to the second light source 22, an acute angle between the first surface 521 and a surface of the second light guide plate 12 facing the first light guide plate 11 is α2, and an acute angle between the second surface 522 and the surface of the second light guide plate 12 facing the first light guide plate 11 is β2, wherein α2>β2; and after light emitted by the second light source 22 is incident into the second light guide plate 12, it can be totally reflected on the second surface 522 of the second microstructure 52. Exemplarily, when the second microstructure 52 is looked down from a side of the second light guide plate 12 facing the first light guide plate 11, the second surface 522 may have a rectangular shape, a trapezoidal shape, or other shapes. In this example, a propagation process of the light emitted by the second light source 22 within the second light guide plate 12 may include: the light emitted by the second light source 22 is incident into the second light guide plate 12 in a side-incidence manner, a part of the light is totally reflected at a position where the second microstructure 52 is not disposed, a part of the light is totally reflected on a surface of the second light guide plate 12 facing away from the first light guide plate 11 and is then incident into the second microstructure 52, and is totally reflected on the second surface 522 of the second microstructure 52 and then emitted from the surface of the second light guide plate 12 facing away from the first light guide plate 11 at the second set emitting angle θ2; in addition, there is still a part of the light which is incident into the first surface 521 of the second microstructure 52 and is reflected and refracted and then emitted from the second light guide plate 12, this part of emitted light belongs to stray light, and in order to reduce this part of stray light, when designing the second microstructure 52, an area of the first surface 521 may be designed to be smaller.

In practical applications, in examples of FIG. 4b and FIG. 5b, a value of α1 and a value of β1 of the first microstructure 51 and a value of α2 and a value of β2 of the second microstructure 52 may be set according to set emitting angles (i.e., the first set emitting angle θ1 and the second set emitting angle θ2) of a backlight beam emitted from the first light guide plate 11 and the second light guide plate 12. In some examples, since a light beam is totally reflected from a microstructure surface of a light guide plate to form a pointing backlight with a fixed emitting angle, theoretically, the larger the angles of β1 and β2 are, the smaller the viewing angle (i.e., an emitting angle) of the pointing backlight is.

Figure 6:
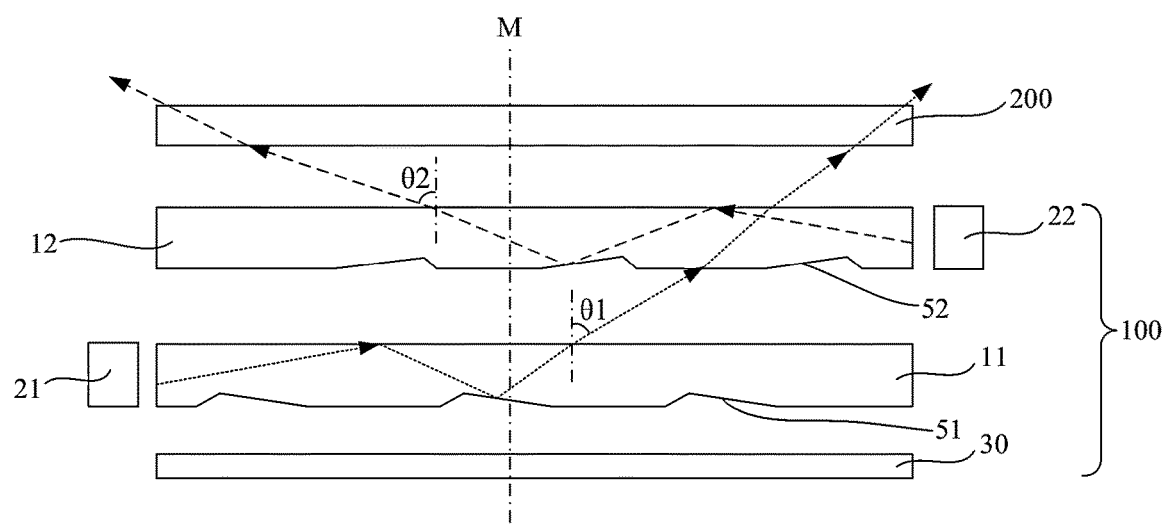
FIG. 6 is a schematic diagram of a structure of a display apparatus according to some other exemplary embodiments.

In another example of the present embodiment, as shown in FIG. 6, FIG. 6 is a schematic diagram of a structure of a display apparatus according to some other exemplary embodiments, the first microstructure 51 and the second microstructure 52 may both be a V-shaped groove, and a V-shaped groove of the first microstructure 51 and a V-shaped groove of the second microstructure 52 may have opposite inclination directions.

Figure 7A:
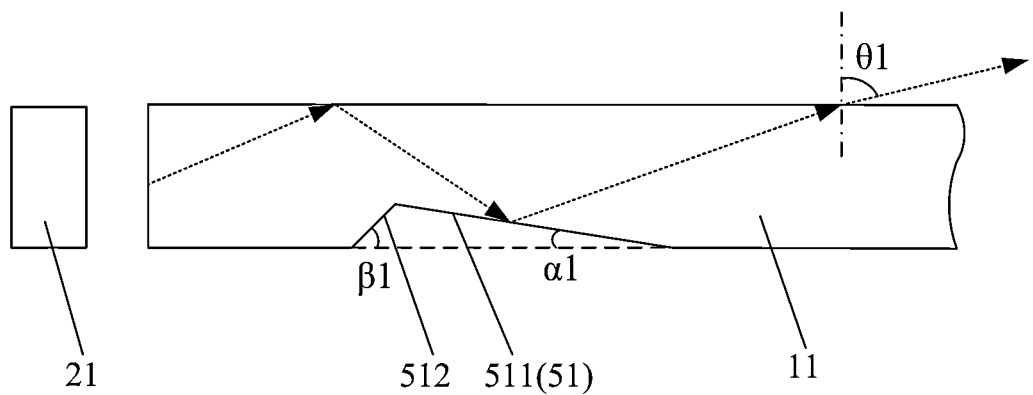
FIG. 7a is a schematic diagram of an optical path of light emitted by a first light source propagating within a first light guide plate in some other exemplary embodiments.

Exemplarily, as shown in FIG. 7a, FIG. 7a is a schematic diagram of an optical path of light emitted by a first light source propagating within a first light guide plate in some other exemplary embodiments, the first microstructure 51 is a V-shaped groove; the first microstructure 51 includes a first surface 511 away from the first light source 21 and a second surface 512 close to the first light source 21, an acute angle between the first surface 511 and a surface of the first light guide plate 11 facing away from the second light guide plate 12 is α1, and an acute angle between the second surface 512 and the surface of the first light guide plate 11 facing away from the second light guide plate 12 is β1, wherein α1<β1; and after light emitted by the first light source 21 is incident into the first light guide plate 11, it can be totally reflected on the first surface 511 of the first microstructure 51. In this example, a propagation process of the light emitted by the first light source 21 within the first light guide plate 11 may include: the light emitted by the first light source 21 is incident into the first light guide plate 11 in a side-incidence manner, a part of the light is totally reflected at a position where the first microstructure 51 is not disposed, a part of the light is totally reflected on a surface of the first light guide plate 11 facing the second light guide plate 12 and is then incident into the first microstructure 51, and is totally reflected on the first surface 511 of the first microstructure 51 and then emitted from the surface of the first light guide plate 11 facing the second light guide plate 12 at the first set emitting angle θ1; in addition, there is still a part of the light which is incident on the second surface 512 of the first microstructure 51 and is reflected and refracted and then emitted from the first light guide plate 11, this part of emitted light belongs to stray light, and in order to reduce this part of stray light, when designing the first microstructure 51, an area of the second surface 512 may be designed to be smaller.

Figure 7B:
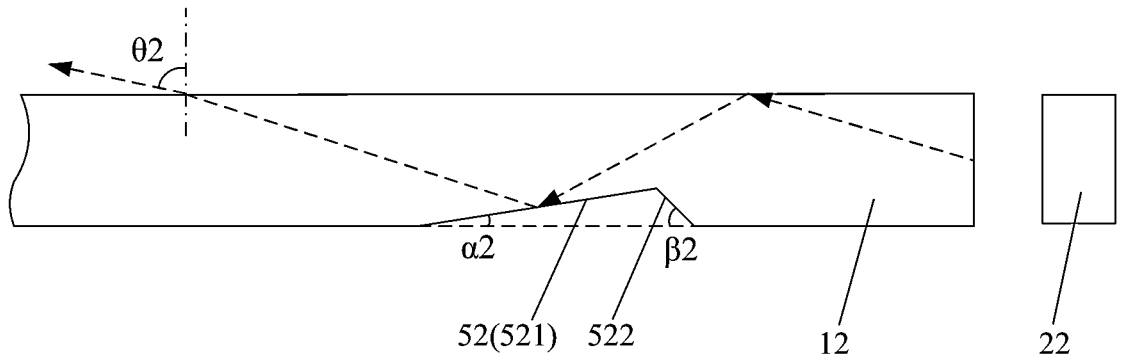
FIG. 7b is a schematic diagram of an optical path of light emitted by a second light source propagating within a second light guide plate in some other exemplary embodiments.

Exemplarily, as shown in FIG. 7b, FIG. 7b is a schematic diagram of an optical path of light emitted by a second light source propagating within a second light guide plate in some other exemplary embodiments, the second microstructure 52 is a V-shaped groove, the second microstructure 52 includes a first surface 521 away from the second light source 22 and a second surface 522 close to the second light source 22, an acute angle between the first surface 521 and a surface of the second light guide plate 12 facing the first light guide plate 11 is α2, and an acute angle between the second surface 522 and the surface of the second light guide plate 12 facing the first light guide plate 11 is β2, wherein α2<β2; and after light emitted by the second light source 22 is incident into the second light guide plate 12, it can be totally reflected on the first surface 521 of the second microstructure 52. In this example, a propagation process of the light emitted by the second light source 22 within the second light guide plate 12 may include: the light emitted by the second light source 22 is incident into the second light guide plate 12 in a side-incidence manner, a part of the light is totally reflected at a position where the second microstructure 52 is not disposed, a part of the light is totally reflected on a surface of the second light guide plate 12 facing away from the first light guide plate 11 and is then incident into the second microstructure 52, and is totally reflected on the first surface 521 of the second microstructure 52 and then emitted from the surface of the second light guide plate 12 facing away from the first light guide plate 11 at the second set emitting angle θ2; in addition, there is still a part of the light which is incident on the second surface 522 of the second microstructure 52 and is reflected and refracted and then emitted from the second light guide plate 12, this part of emitted light belongs to stray light, and in order to reduce this part of stray light, when designing the second microstructure 52, an area of the second surface 522 may be designed to be smaller.

In practical applications, in examples of FIG. 7a and FIG. 7b, a value of α1 and a value of β1 of the first microstructure 51 and a value of α2 and a value of β2 of the second microstructure 52 may be set according to set emitting angles (i.e., the first set emitting angle θ1 and the second set emitting angle θ2) of a backlight beam emitted from the first light guide plate 11 and the second light guide plate 12. In some examples, since a light beam is totally reflected from a microstructure surface of a light guide plate to form a pointing backlight with a fixed emitting angle, theoretically, the larger the angles of α1 and α2 are, the smaller the viewing angle (i.e., an emitting angle) of the pointing backlight is.

In some exemplary embodiments, an arrangement density of the first microstructures 51 gradually increases along a direction of the first light guide plate 11 away from the first light source 21; or/and, an arrangement density of the second microstructures 52 gradually increases along a direction of the second light guide plate 12 away from the second light source 22. In this way, a case that a light beam gradually weakens when propagating within a light guide plate may be avoided or reduced, and uniformity of overall backlight may be improved.

Figure 8A:
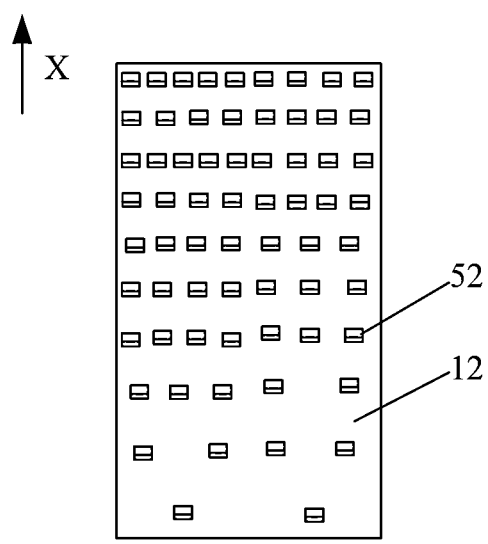
FIG. 8a is a schematic diagram of a planar structure of a second light guide plate in some exemplary embodiments.

Taking the second light guide plate 12 as an example, in an example of the present embodiment, as shown in FIG. 8a, FIG. 8a is a schematic diagram of a planar structure of the second light guide plate 12 in some exemplary embodiments, an arrangement density of the second microstructures 52 gradually increases along a direction X of the second light guide plate 12 away from the second light source 22, and an arrangement of the second microstructures 52 may be regular. Exemplarily, the plurality of second microstructures 52 may be arranged in a plurality of rows (a row direction may be perpendicular to the direction X), a quantity of second microstructures 52 arranged in each row may be gradually increased along the direction X of the second light guide plate 12 away from the second light source 22, and a row spacing between two adjacent rows of second microstructures 52 may be gradually decreased. Similarly, an arrangement manner of the plurality of first microstructures 51 of the first light guide plate 11 may be the same as an arrangement manner of the plurality of second microstructures 52 of the second light guide plate 12.

Figure 8B:
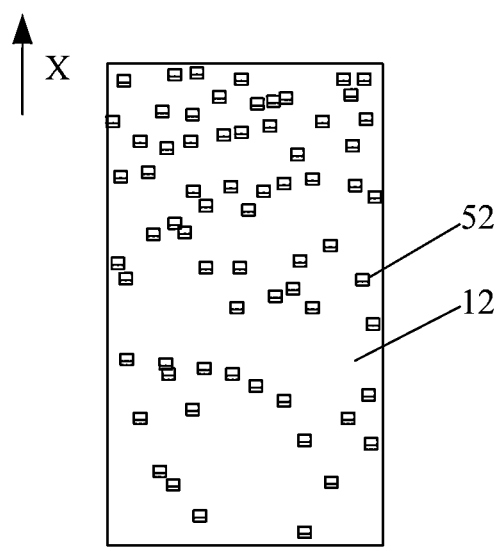
FIG. 8b is a schematic diagram of a planar structure of a second light guide plate in some other exemplary embodiments.

Taking the second light guide plate 12 as an example, in another example of the present embodiment, as shown in FIG. 8b, FIG. 8b is a schematic diagram of a planar structure of the second light guide plate 12 in some other exemplary embodiments, an arrangement density of the second microstructures 52 gradually increases along a direction X of the second light guide plate 12 away from the second light source 22, and an arrangement manner of the second microstructures 52 may be irregular and random. Similarly, an arrangement manner of the plurality of first microstructures 51 of the first light guide plate 11 may be the same as an arrangement manner of the plurality of second microstructures 52 of the second light guide plate 12.

In some exemplary embodiments, sizes of the first microstructures 51 gradually increase along a direction of the first light guide plate 11 away from the first light source 21; or/and, sizes of the second microstructures 52 gradually increase along a direction of the second light guide plate 12 away from the second light source 22. In this way, a case that a light beam gradually weakens when propagating within a light guide plate may be avoided or reduced, and uniformity of overall backlight may be improved.

Figure 8C:
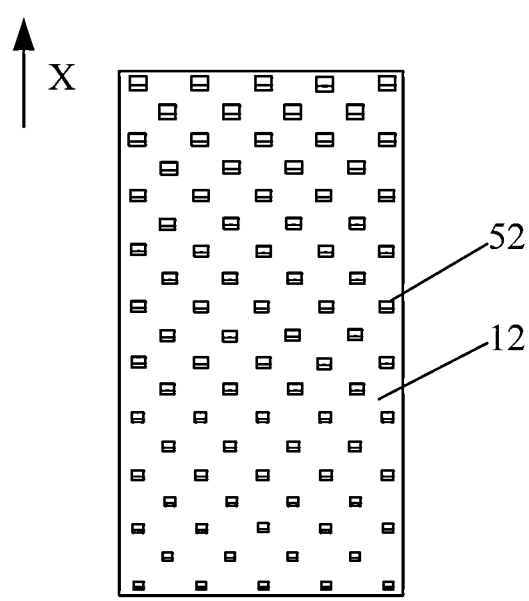
FIG. 8c is a schematic diagram of a planar structure of a second light guide plate in still some other exemplary embodiments.

Taking the second light guide plate 12 as an example, as shown in FIG. 8c, FIG. 8c is a schematic diagram of a planar structure of the second light guide plate 12 in still some other exemplary embodiments, sizes of the second microstructures 52 gradually increase along a direction X of the second light guide plate 12 away from the second light source 22. Exemplarily, the plurality of second microstructures 52 may be arranged in an array and may be arranged in a plurality of rows, two adjacent rows of second microstructures 52 may be staggered, and a plurality of second microstructures 52 in a same row may have a same size. Similarly, an arrangement manner of the plurality of first microstructures 51 of the first light guide plate 11 may be the same as an arrangement manner of the plurality of second microstructures 52 of the second light guide plate 12.

In some exemplary embodiments, the plurality of first microstructures 51 are randomly arranged or regularly arranged on the first light guide plate 11; or/and, the plurality of second microstructures 52 are randomly arranged or regularly arranged on the second light guide plate 12.

Taking the second light guide plate 12 as an example, in the example of FIG. 8a, arrangement densities of the second microstructures 52 gradually increase along a direction X of the second light guide plate 12 away from the second light source 22, and an arrangement of the second microstructures 52 is a regular arrangement. In the example of FIG. 8b, arrangement densities of the second microstructures 52 gradually increase along a direction X of the second light guide plate 12 away from the second light source 22, and an arrangement manner of the second microstructures 52 is irregular and random. In the example of FIG. 8c, sizes of the second microstructures 52 gradually increase along the direction X of the second light guide plate 12 away from the second light source 22, and the plurality of second microstructures 52 are regularly arranged in an array.

In some exemplary embodiments, a luminous intensity of the first light source 21 may be greater than a luminous intensity of the second light source 22.

Exemplarily, as shown in FIG. 1, since light emitted from the first light guide plate 11 is partially scattered and absorbed by the second light guide plate 12 when passing through the second light guide plate 12, in order to ensure that the display panel 200 of the display apparatus has same brightness at left and right side viewing angles, a luminous intensity of the first light source 21 that provides a light source for the first light guide plate 11 may be greater than a luminous intensity of the second light source 22 that provides a light source for the second light guide plate 12.

A Light Emitting Diode (LED) light source may be adopted for both the first light source 21 and the second light source 22.

Figure 9:
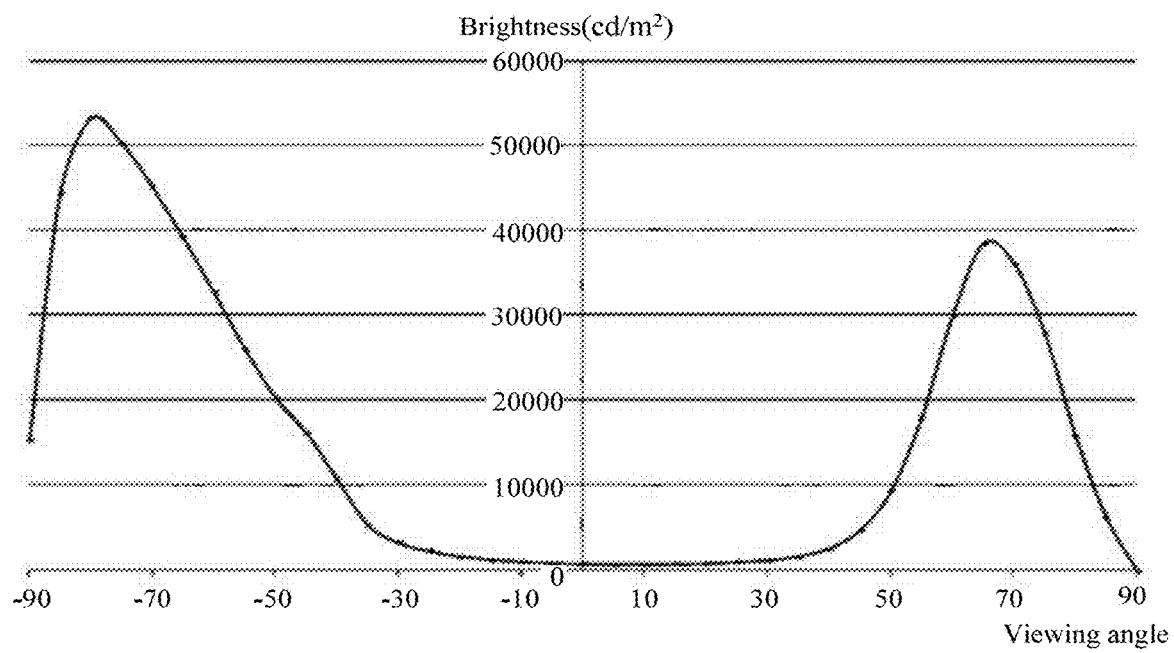
FIG. 9 is a distribution diagram of intensities, with viewing angles, of a light beam emitted from a first light guide plate and a second light guide plate, under a same current of a first light source and a second light source in some exemplary embodiments.

As shown in FIG. 9, FIG. 9 is a distribution diagram of intensities, with viewing angles, of a light beam emitted from the first light guide plate 11 and the second light guide plate 12, under a same current of the first light source 11 and the second light source 12 in some exemplary embodiments, in FIG. 9, a curve with a positive-valued viewing angle is a distribution diagram of intensities, with viewing angles, of a light beam emitted from the first light guide plate 11, and a curve with a negative-valued viewing angle is a distribution diagram of intensities, with viewing angles, of a light beam emitted from the second light guide plate 12. It may be seen that under the same current of the first light source 21 and the second light source 22, an intensity of a light beam emitted from the first light guide plate 11 is lower than an intensity of a light beam emitted from the second light guide plate 12 as a whole. Therefore, setting a luminous intensity of the first light source 21 to be greater than a luminous intensity of the second light source 22 is beneficial to ensuring that the display apparatus has same brightness at left and right side viewing angles.

In some exemplary embodiments, as shown in FIG. 1, a numerical value of the first set emitting angle $\theta 1$ is taken as a positive value, and a numerical value of the second set emitting angle $\theta 2$ is taken as a negative value; absolute values of the first set emitting angle $\theta 1$ and the second set emitting angle $\theta 2$ may be equal or unequal, the absolute values of the first set emitting angle $\theta 1$ and the second set emitting angle $\theta 2$ may range from 0° to 90°, that is, the absolute values of the first set emitting angle $\theta 1$ and the second set emitting angle $\theta 2$ may be set to an arbitrary angle between 0° and 90°.

Figure 10:
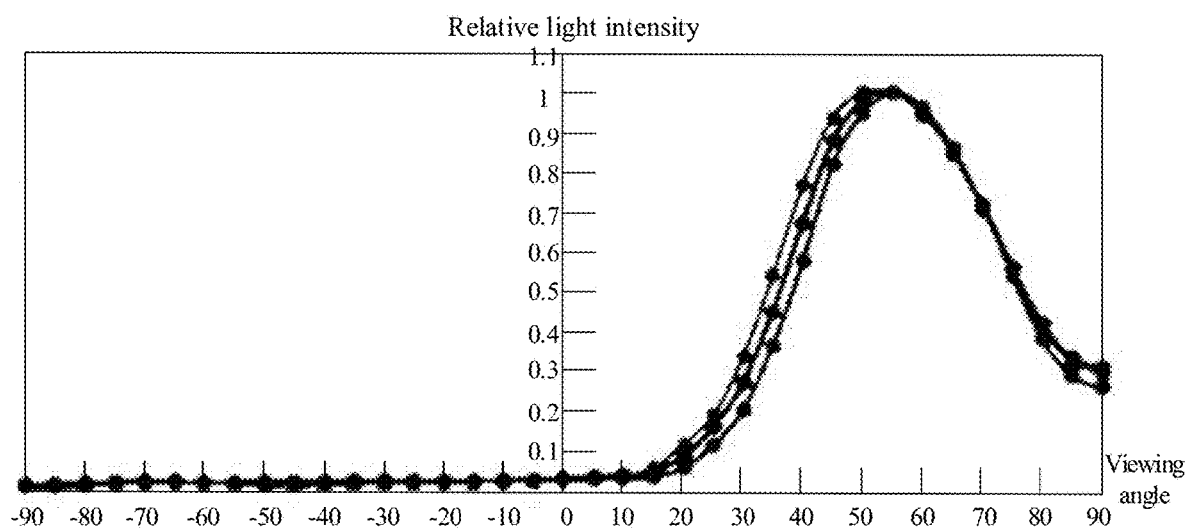
FIG. 10 is a distribution diagram of light intensities, with viewing angles, of backlight with a center viewing angle of 75° emitted from a first light guide plate after passing through a display panel, in a display apparatus according to some exemplary embodiments.

Exemplarily, in an example of this embodiment, taking backlight emitted from the first light guide plate 11 as an example, when a backlight center viewing angle (i.e., the first set emitting angle) is set to 75°, a distribution situation of light intensities, with viewing angles, of backlight with a 75° center viewing angle after finally passing through the display panel 200 is tested, as shown in FIG. 10, FIG. 10 is a distribution diagram of light intensities, with viewing angles, of backlight with a center viewing angle of 75° emitted from the first light guide plate 11 after passing through the display panel 200, in a display apparatus according to some exemplary embodiments, three curves in FIG. 10 are three test results, and it may be seen that after the backlight with the 75° center viewing angle finally passes through the display panel 200, a center viewing angle of the display panel 200 shifts from 75° of the backlight to 55°, and a main reason is that the display panel 200 has different transmittances at different angles, and a transmittance is high in a middle and low on both sides, and finally the center viewing angle of the display panel 200 will become smaller on a basis of the backlight center viewing angle. In addition, it may also be seen that a light intensity can be reduced to within 5% of a light intensity of a center viewing angle only outside 30° from left and right of the center viewing angle of the display panel 200. Therefore, in order to reduce intermediate crosstalk, when designing microstructures of the first light guide plate 11 and the second light guide plate 12, center viewing angles of backlight beams emitted from the first light guide plate 11 and the second light guide plate 12 may be made as great as possible to compensate for a loss of transmittance of the display panel 200 at different angles. In practical applications, center viewing angles (i.e., the first set emitting angle $\theta 1$ and the second set emitting angle $\theta 2$)

of backlight emitted from the first light guide plate 11 and the second light guide plate 12 may be set according to usage scenario (e.g., a viewing angle position) of the display apparatus, a situation of a loss of transmittance of the display panel 200 at different angles, and etc.

In some exemplary embodiments, as shown in FIG. 1, the backlight assembly 100 may further include a reflector 30 disposed on a side of the first light guide plate 11 facing away from the second light guide plate 12.

Figure 11A:
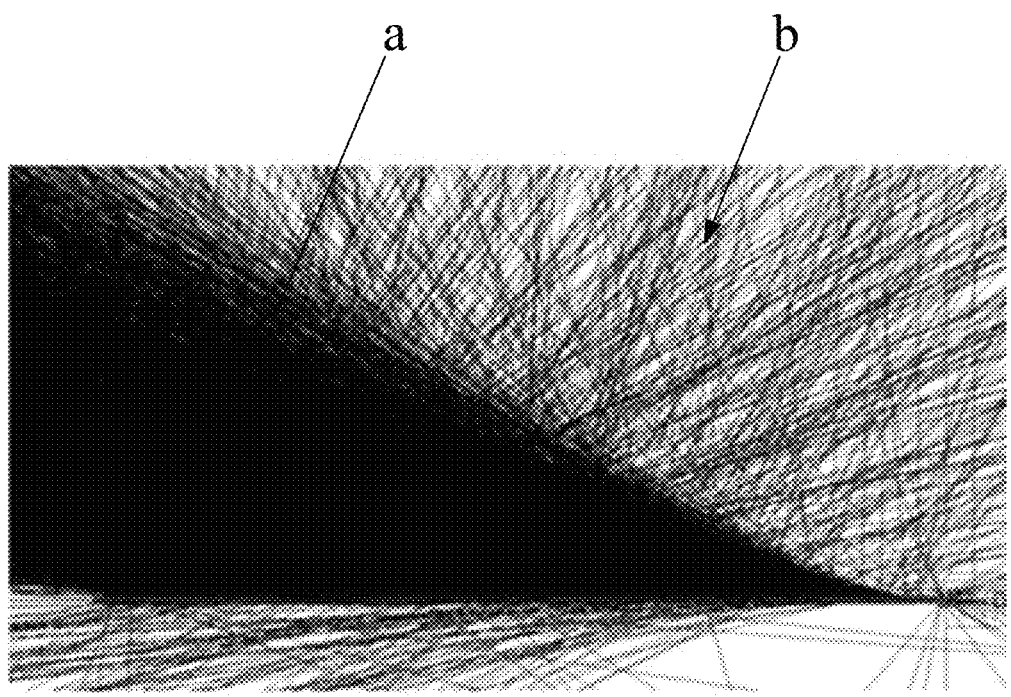
FIG. 11a is a schematic diagram of light emitting simulation of a backlight assembly in which a reflector is used in some exemplary embodiments.
Figure 11B:
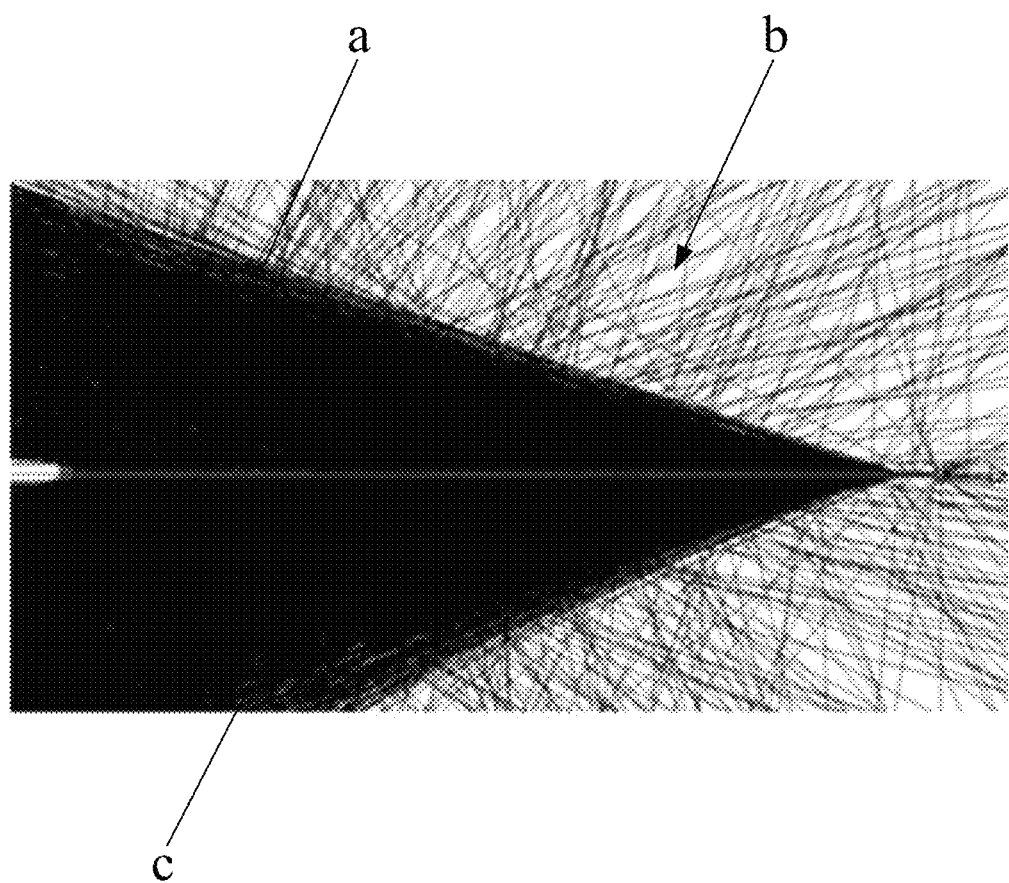
FIG. 11b is a schematic diagram of light emitting simulation of a backlight assembly in which a reflector is not used in some exemplary embodiments.

As shown in FIG. 11a and FIG. 11b, FIG. 11a is a schematic diagram of light emitting simulation of a backlight assembly 100 in which a reflector 30 is used in some exemplary embodiments, FIG. 11b is a schematic diagram of light emitting simulation of a backlight assembly 100 in which a reflector 30 is not used in some exemplary embodiments, in FIG. 11a and FIG. 11b, a region a represents a pointing backlight beam emitted from an upper surface of a light guide plate (i.e., a surface of the light guide plate facing a display panel), a region b represents stray light emitted from the upper surface of the light guide plate, and a region c represents light emitted from a bottom surface of the light guide plate (i.e., a surface of the light guide plate facing away from the display panel). It may be seen that, in the presence of the reflector 30, the light guide plate emits a higher intensity of pointing backlight, but with more stray light; and in the absence of the reflector 30, at least half of light is emitted from the bottom surface of the light guide plate and is lost, but light emitted from the upper surface of the light guide plate has better directivity, with less stray light. In terms of use effect, the presence or absence of the reflector 30 does not affect normal pointing backlight emission; in the absence of the reflector 30, backlight emission efficiency is low and directivity is good; and in the presence of the reflector 30, the backlight emission efficiency is high, but there is more stray light.

An embodiment of the present disclosure further provides a display apparatus. As shown in FIG. 1, the display apparatus includes a display panel 200 and the backlight assembly 100 according to any embodiment, the backlight assembly 100 is disposed on a side of the display panel 200 facing away from a display side, and the second light guide plate 12 is disposed between the first light guide plate 11 and the display panel 200. Exemplarily, the display panel 200 may be a liquid crystal display panel. The display apparatus may be applied to scenarios of the field of vehicle-mounted and the like where left and right viewing angles have inconsistent requirements for displayed images.

In the drawings, a size of a constituent element, and a thickness of a layer or a region are sometimes exaggerated for clarity. Therefore, an implementation mode of the present disclosure is not necessarily limited to the size, and a shape and size of each component in the drawings do not reflect an actual scale. In addition, the drawings schematically illustrate some examples, and the implementation mode of the present disclosure is not limited to shapes or numerical values shown in the drawings.

In the description herein, "parallel" refers to a state in which an angle formed by two straight lines is −10° or more and 10° or less, and thus includes a state in which the angle is −5° or more and 5° or less. In addition, "perpendicular" refers to a state in which an angle formed by two straight lines is 80° or more and 100° or less, and thus includes a state in which the angle is 85° or more and 95° or less.

In the specification, a triangle, rectangle, trapezoid, pentagon, hexagon, or the like is not strictly defined, and may be an approximate triangle, rectangle, trapezoid, pentagon, hexagon, or the like, there may be some small deformation caused by tolerance, and there may be chamfers, arc edges, and deformations, etc.

In the specification, for convenience, wordings indicating orientations or positional relationships, such as "center", "upper", "lower", "front", "back", "vertical", "horizontal", "top", "bottom", "inside", and "outside", are used for describing positional relationships of constituent elements with reference to the drawings, and are only for convenience of describing the specification and simplifying the description, rather than indicating or implying that a referred apparatus or element must have a particular orientation, and be constructed and operated in the particular orientation. Thus, they cannot be construed as limitations to the present disclosure. The positional relationships of the constituent elements are appropriately changed according to directions for describing the constituent elements. Therefore, appropriate replacements may be made according to situations without being limited to the wordings described in the specification.

In the description herein, unless otherwise specified and defined explicitly, terms "connection", "fixed connection", "installation", and "assembly" should be understood in a broad sense, and, for example, it may be a fixed connection, a detachable connection, or an integrated connection; and terms "installation", "connection", and "fixed connection" may be a direct connection, an indirect connection through an intermediate component, or communication inside two elements. For those of ordinarily skills in the art, meanings of the above terms in the embodiments of the present disclosure may be understood according to situations.

The invention claimed is:

1. A backlight assembly, comprising a first light guide plate and a second light guide plate disposed in parallel and opposite to each other, a first light source disposed on a side of the first light guide plate, and a second light source disposed on a side of the second light guide plate, wherein the first light source and the second light source are located on opposite sides of the backlight assembly, and the second light guide plate is disposed on a light emitting side of the first light guide plate;

a plurality of first microstructures are disposed on a surface of the first light guide plate facing away from the second light guide plate, and light emitted by the first light source is able to be emitted from a surface of the first light guide plate facing the second light guide plate at a first set emitting angle, after being incident into the first light guide plate and reflected by the plurality of first microstructures;

a plurality of second microstructures are disposed on a surface of the second light guide plate facing the first light guide plate, and light emitted by the second light source is able to be emitted from a surface of the second light guide plate facing away from the first light guide plate at a second set emitting angle, after being incident into the second light guide plate and reflected by the plurality of second microstructures;

taking a plane perpendicular to a light emitting surface of the backlight assembly as a reference plane, in the reference plane, the first set emitting angle is biased to one side compared with a front viewing angle direction of the light emitting surface of the backlight assembly, and the second set emitting angle is biased to the other side compared with the front viewing angle direction of the light emitting surface of the backlight assembly;

the first light source and the second light source are under a same current, and a luminous intensity of the first light source is greater than a luminous intensity of the second light source.

2. The backlight assembly according to claim 1, wherein light emitted by the first light source is incident into the first light guide plate and is totally reflected at a position where a first microstructure is not disposed and is then incident into the first microstructures, and the light incident into the first microstructures is able to be totally reflected at the first microstructures, and then emitted from the surface of the first light guide plate facing the second light guide plate at the first set emitting angle;

or/and, light emitted by the second light source is incident into the second light guide plate and is totally reflected at a position where a second microstructure is not disposed and is then incident into the second microstructures, and the light incident into the second microstructures is able to be totally reflected at the second microstructures, and then emitted from the surface of the second light guide plate facing away from the first light guide plate at the second set emitting angle.

3. The backlight assembly according to claim 1, wherein a first microstructure is a wedge-shaped protrusion having a triangular cross section; or a first microstructure is a V-shaped groove.

4. The backlight assembly according to claim 3, wherein the first microstructure is a wedge-shaped protrusion having a triangular cross section; the first microstructure comprises a first surface away from the first light source and a second surface close to the first light source, an acute angle between the first surface and the surface of the first light guide plate facing away from the second light guide plate is $\alpha$, and an acute angle between the second surface and the surface of the first light guide plate facing away from the second light guide plate is $\beta 1$, wherein $\alpha 1 > \beta 1$; and after the light emitted by the first light source is incident into the first light guide plate, the light is able to be totally reflected on the second surface of the first microstructure.

5. The backlight assembly according to claim 3, wherein the first microstructure is a V-shaped groove; the first microstructure comprises a first surface away from the first light source and a second surface close to the first light source, an acute angle between the first surface and the surface of the first light guide plate facing away from the second light guide plate is $\alpha 1$, and an acute angle between the second surface and the surface of the first light guide plate facing away from the second light guide plate is $\beta 1$, wherein $\alpha 1 < \beta 1$;

and after the light emitted by the first light source is incident into the first light guide plate, the light is able to be totally reflected on the first surface of the first microstructure.

6. The backlight assembly according to claim 1, wherein a second microstructure is a wedge-shaped protrusion having a triangular cross section; or a second microstructure is a V-shaped groove.

7. The backlight assembly according to claim 6, wherein the second microstructure is a wedge-shaped protrusion having a triangular cross section, the second microstructure comprises a first surface away from the second light source and a second surface close to the second light source, an acute angle between the first surface and the surface of the second light guide plate facing the first light guide plate is $\alpha$, and an acute angle between the second surface and the surface of the second light guide plate facing the first light guide plate is $\beta 2$, wherein $\alpha 2 > \beta 2$; and after the light emitted by the second light source is incident into the second light guide plate, the light is able to be totally reflected on the second surface of the second microstructure.

8. The backlight assembly according to claim 6, wherein the second microstructure is a V-shaped groove, the second microstructure comprises a first surface away from the second light source and a second surface close to the second light source, an acute angle between the first surface and the surface of the second light guide plate facing the first light guide plate is $\alpha 2$, and an acute angle between the second surface and the surface of the second light guide plate facing the first light guide plate is $\beta 2$, wherein $\alpha 2 < \beta 2$; and after the light emitted by the second light source is incident into the second light guide plate, the light is able to be totally reflected on the first surface of the second microstructure.

9. The backlight assembly according to claim 1, wherein an arrangement density of the first microstructures gradually increases along a direction of the first light guide plate away from the first light source;

or/and, an arrangement density of the second microstructures gradually increases along a direction of the second light guide plate away from the second light source.

10. The backlight assembly according to claim 1, wherein sizes of the first microstructures gradually increase along a direction of the first light guide plate away from the first light source;

or/and, sizes of the second microstructures gradually increase along a direction of the second light guide plate away from the second light source.

11. The backlight assembly according to claim 1, wherein the plurality of first microstructures are randomly arranged or regularly arranged on the first light guide plate;

or/and, the plurality of second microstructures are randomly arranged or regularly arranged on the second light guide plate.

12. The backlight assembly according to claim 1, wherein a numerical value of the first set emitting angle is taken as a positive value, and a numerical value of the second set emitting angle is taken as a negative value; absolute values of the first set emitting angle and the second set emitting angle are equal or unequal, and the absolute values of the first set emitting angle and the second set emitting angle range from 0° to 90°.

13. The backlight assembly according to claim 1, further comprising a reflector disposed on a side of the first light guide plate facing away from the second light guide plate.

14. A display apparatus, comprising a display panel and a backlight assembly according to claim 1, wherein the backlight assembly is disposed on a side of the display panel facing away from a display side, and the second light guide plate is disposed between the first light guide plate and the display panel.

15. The backlight assembly according to claim 2, wherein a first microstructure is a wedge-shaped protrusion having a triangular cross section; or a first microstructure is a V-shaped groove.

16. The backlight assembly according to claim 2, wherein a second microstructure is a wedge-shaped protrusion having a triangular cross section; or a second microstructure is a V-shaped groove.

17. A display apparatus, comprising a display panel and a backlight assembly according to claim 2, wherein the backlight assembly is disposed on a side of the display panel facing away from a display side, and the second light guide plate is disposed between the first light guide plate and the display panel.

18. A display apparatus, comprising a display panel and a backlight assembly according to claim 3, wherein the backlight assembly is disposed on a side of the display panel facing away from a display side, and the second light guide plate is disposed between the first light guide plate and the display panel.

19. A display apparatus, comprising a display panel and a backlight assembly according to claim 6, wherein the backlight assembly is disposed on a side of the display panel facing away from a display side, and the second light guide plate is disposed between the first light guide plate and the display panel.

* * * * *